INVENTOR
Paul F. Swenson
Myron T. Cooperrider
BY
John H. Leonard,
their Attorney.

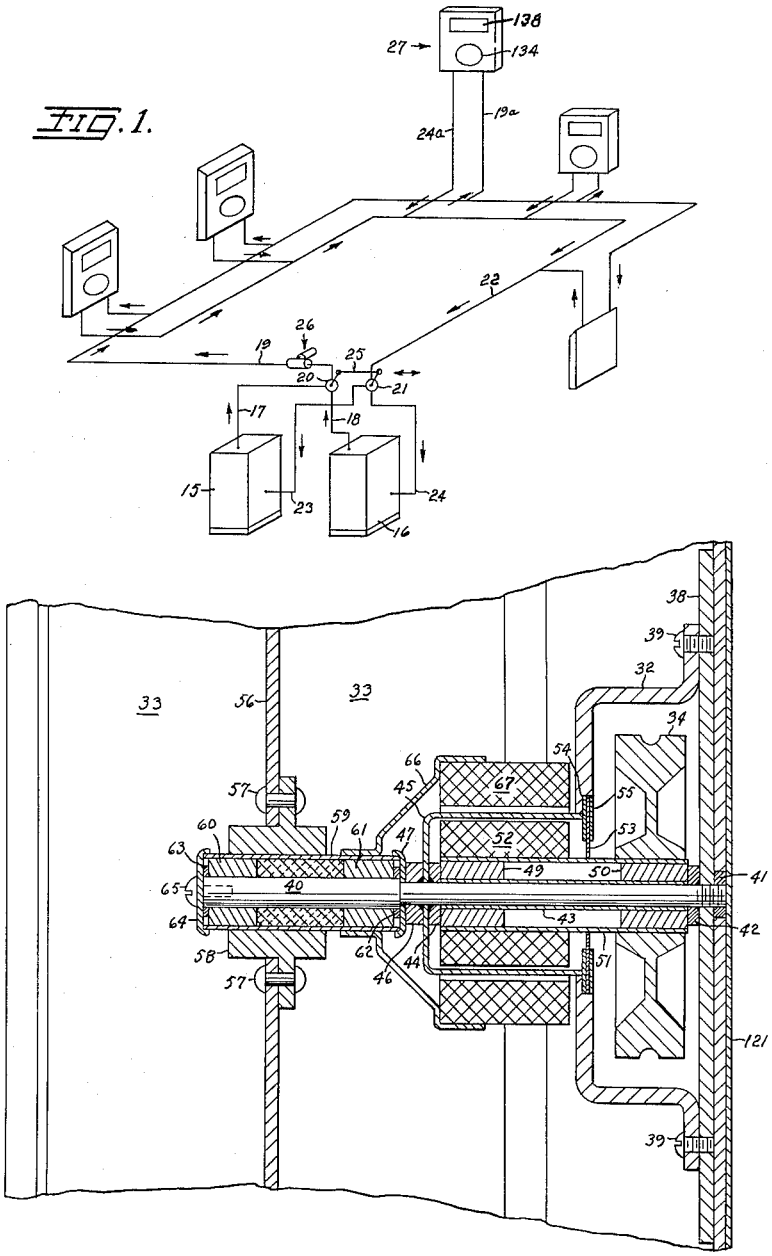

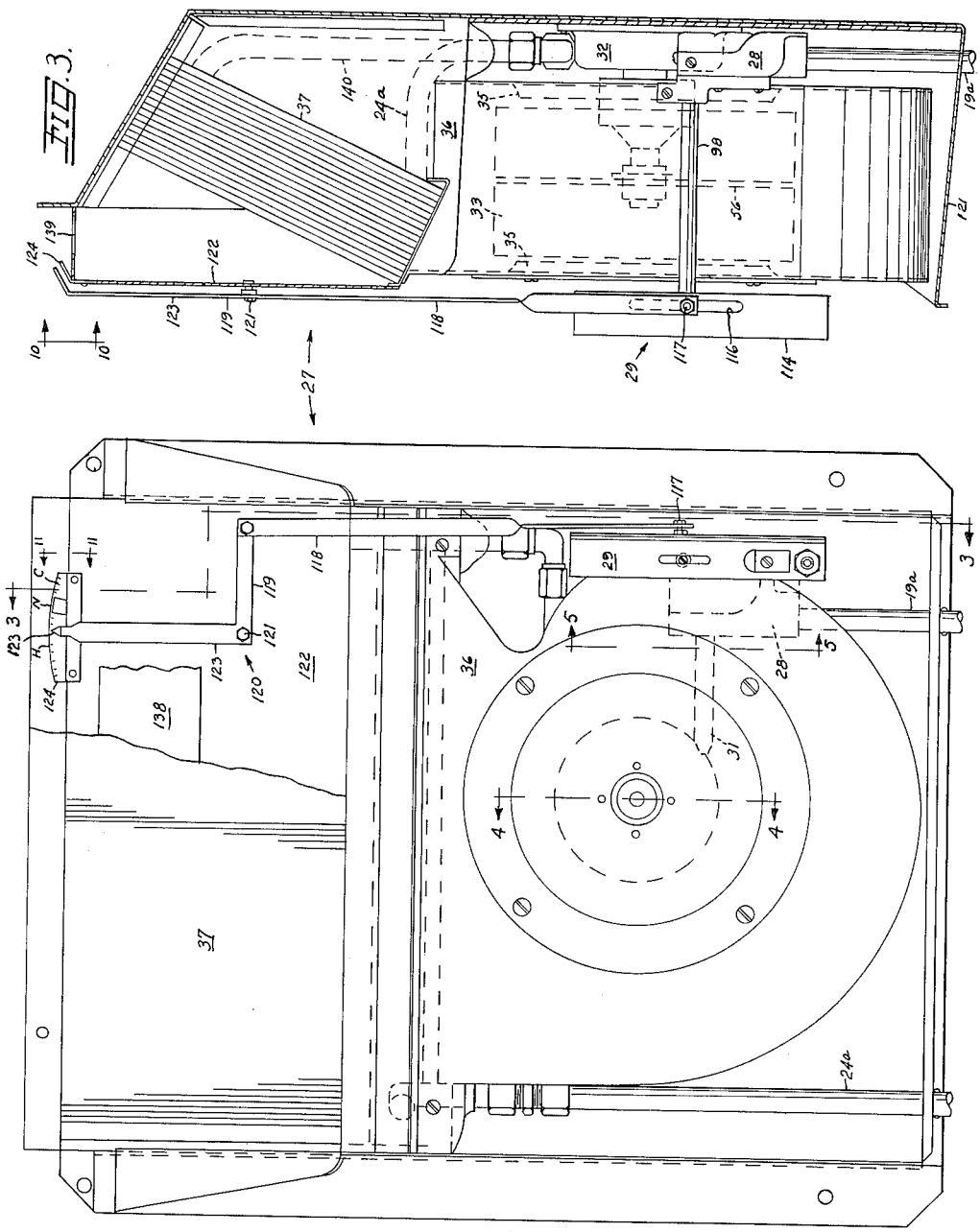

INVENTOR
Paul F. Swenson
Myron T. Cooperrider

BY
Their Attorney.

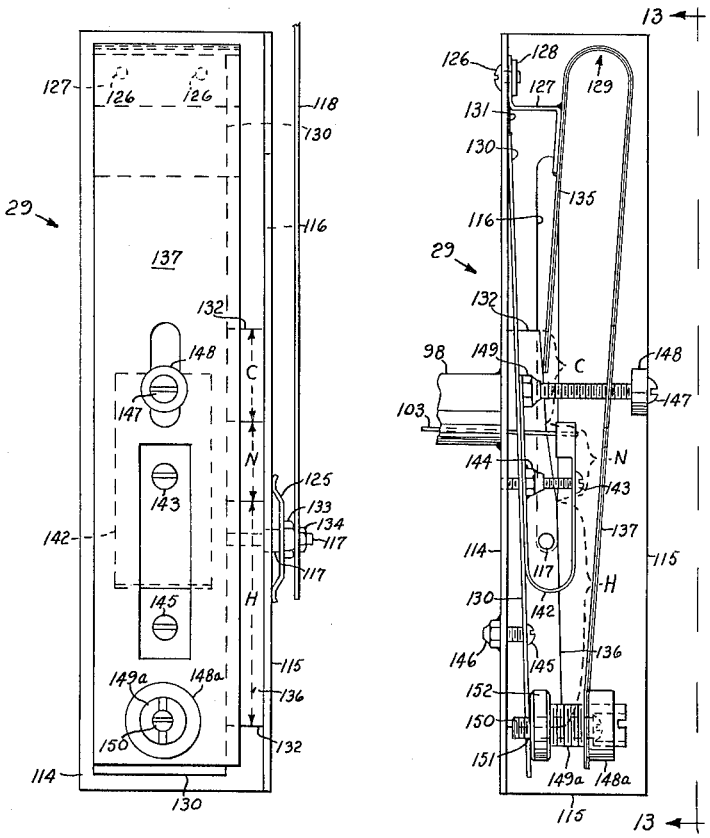

United States Patent Office 3,232,337
Patented Feb. 1, 1966

3,232,337
AIR CONDITIONER WITH FORCED CIRCULATION SEALED WATER SYSTEM EMPLOYING INTERNAL WATER TURBINE DRIVING EXTERNAL FAN
Paul F. Swenson, Cleveland Heights, and Myron T. Cooperrider, North Royalton, Ohio, assignors, by mesne assignments, to Space Conditioning, Inc., Harrisonburg, Va., a corporation of Maryland
Application Aug. 28, 1963, Ser. No. 305,580, now Patent No. 3,145,925, dated Aug. 25, 1964, which is a continuation of application Ser. No. 862,102, Dec. 28,1959. Divided and this application Dec. 4, 1963, Ser. No. 328,010
2 Claims. (Cl. 165—39)

This application is a division of our copending application Serial No. 305,580, filed August 28, 1963, now U.S. Patent No. 3,145,925, issued August 25, 1964, which copending application is a continuation of application Serial No. 862,102, filed December 28, 1959, now abandoned, which was a continuation-in-part of U.S. application Serial No. 783,404 filed December 29, 1958, now U.S. Patent No. 3,001,479, issued December 26, 1961.

This invention relates generally to improved space air conditioning systems in which either heated or chilled water as required, is pumped from a respective source thereof to a heat exchanger in a space to be heated or cooled where the air in the space is to be conditioned by contact with a high heat conducting barrier separating the air from the water. The particular types of water heating or chilling means to be used in the system is a matter of choice.

More particularly this invention relates to improved devices largely contributing to the successful operation of such a system.

In our copending application Serial No. 305,580 the claims are directed primarily to a heating and cooling system with specific thermostatic control means. The claims of the present application are drawn to a heat exchange system for air conditioning with specific air circulating means involving a magnetic connection between an external fan and a turbine sealed within the system and driven by the circulating heating or cooling water thereof.

Systems of this type usually require power means for circulating the heating or cooling water and for circulating the air to be conditioned. When a single power means is used to circulate both the water for air conditioning and the air to be conditioned, rotating fluid moving parts are required on both sides of the barrier between the air and the water and previously rotating parts have extended through the barrier.

Providing a reliable seal around a rotating part at the barrier has been found to be expensive, costly to maintain and high in frictional power loss. Indeed, in application of this type in home heating, some installations have shown that of the pump power required, about sixty percent has been used up in shaft seal friction.

It is an object of this invention to provide for one of a plurality of spaces to be air conditioned, an air conditioner including a heat exchanger with a barrier of high heat conduction ability in contact on one side with the air in the space and on the other side with water preconditioned as required to condition the space air, together with power means for circulating either heated or chilled water through the heat exchanger, under pressure, for heat exchange purposes and also for operating a water turbine, sealed within the system, and which, by a magnetic connection through the barrier, without power loss at the barrier, drives an external fan for circulating the space air into contact with the exchanger.

It is another object to provide such an air conditioner with conduit means for conducting either heated or chilled water under pressure from a respective source thereof through a turbine control water valve to said water turbine, from said water turbine to the water side of said barrier in a heat exchanger and back to said respective source of said water.

It is another object to provide a turbine control water valve with thermostatic means responsive to the temperature of said air in said space for regulating said valve to control the supply of hot and cold water to said turbine and cause the water supplied to pass over one side of said barrier while driving said fan to pass said air over the other side of said barrier to condition said air as required.

It is another object to provide a driving connection across said barrier between said turbine and said fan requiring no mechanical connection across the barrier nor any opening through said barrier to require frictional sealing thereof.

How these and other objects are attained is disclosed in the following description referring to the attached drawing in which FIG. 1 is a schematic showing of one form of the improved air conditioning system of this invention.

FIG. 2 is a front elevation, with cover removed, of the form of air conditioner and associated parts shown in FIG. 1.

FIG. 3 is a side sectional elevation along the line 3—3 of FIG. 2.

FIG. 4 is a fragmental side sectional elevation along the line 4—4 of FIG. 2.

FIG. 12 is a fragmental elevation of the thermostat of FIG. 5 showing the setting cam positioned to control the cold water supplied to the heat exchanger of FIGS. 1–3.

FIG. 13 is a fragmental front elevation along the line 13—13 of FIG. 12.

Like reference numerals refer to like parts in the several figures of the drawing.

Figure 5:
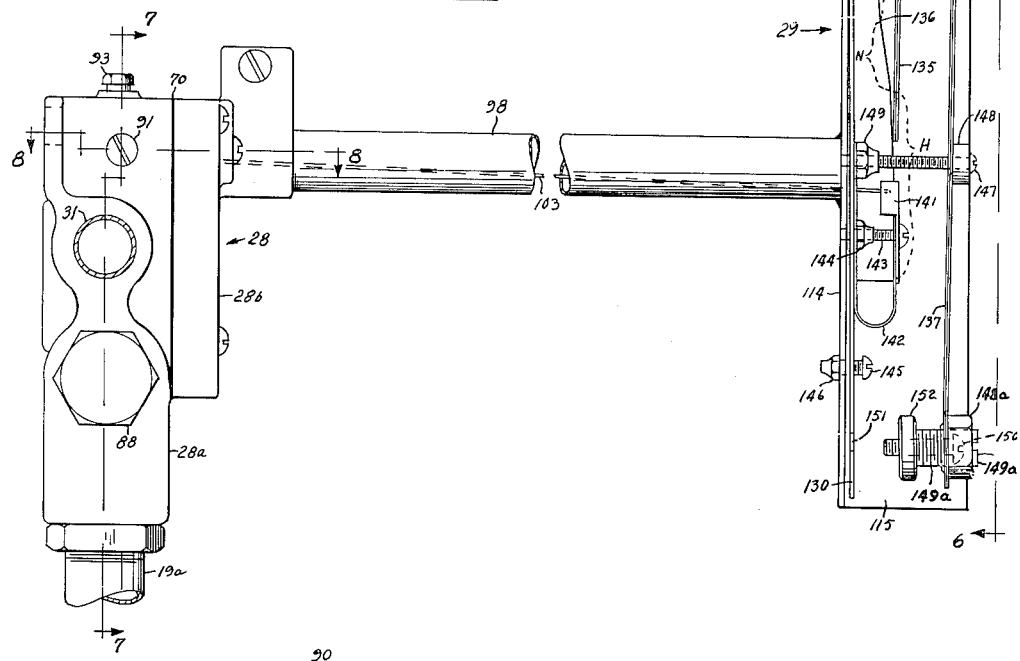
FIG. 5 is a fragmental elevation along the line 5—5 of FIG. 2 showing the thermostat setting cam positioned to control the hot water supplied to the heat exchanger of FIGS. 1–3.

It should be noted that the air conditioner of FIGS. 1, 2, 3 and 4 is for hot water heating and chilled water cooling.

Referring now to FIG. 1, one form of the air conditioning system of this invention is seen to be provided with a water heater 15 by which air conditioning water can be maintained at a suitable temperature of, say, 200° F., and a water chiller 16 by which air conditioning water can be maintained at a suitable temperature of, say, 40° F. Either the outlet pipe 17 of heater 15 or the outlet pipe 18 of chiller 16 can be connected as desired to air conditioner water main 19 by three way valve 20. Similarly three way valve 21 connects return main 22 to either return water pipe 23 of heater 15 or return water pipe 24 of chiller 16. Schematically link 25 can be moved to the left to set valves 20, 21, to connect heater 15 to conditioning water mains 19, 24, or to the right to connect chiller 16 to mains 19, 22. Air conditioning water from either heater 15 or chiller 16 is continuously circulated by motorized pump 26 with main 19 maintained thereby at a sufficiently higher pressure than main 22 to operate the individual room air conditioners of which five are shown in FIG. 1 but of which one only, 27, will be described as shown in FIGS. 1, 2 and 3 to be connected by branch pipes 19a and 22a to mains 19 and 22, respectively. Details of unique parts of conditioner 27 are shown in FIGS. 4 to 13.

Figure 8:
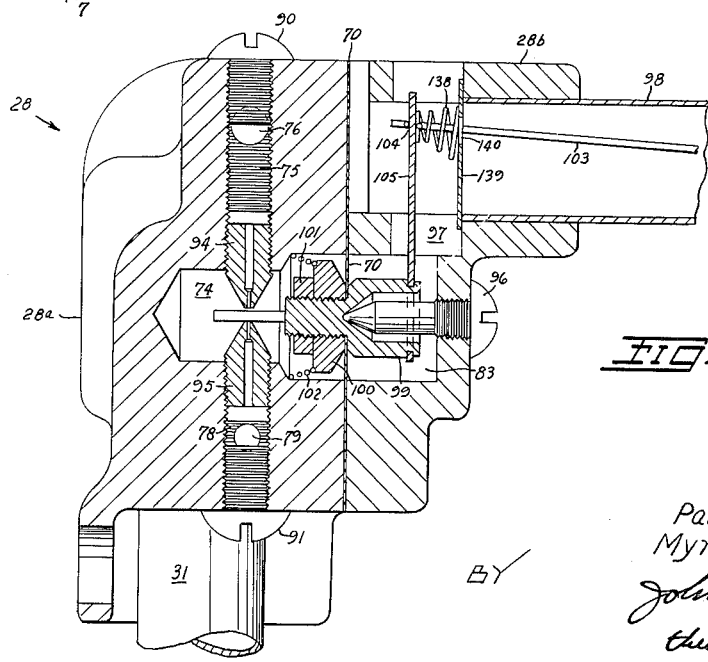
FIG. 8 is a fragmental plan section along the line 8—8 of FIG. 5.

In FIGS. 2 and 3 conditioning water enters conditioner 27 through pipe 19a and enters control valve body 28 from where under the control of thermostat 29, see FIGS. 5 to 10, the water is fed as required through nozzle pipe, see FIGS. 2, 5 and 8, to the interior of turbine housing 32, see FIG. 4, to impinge on turbine wheel 34 to drive fan wheel 33 to draw room air through a lower opening 234 in the casing of air conditioner 27, see FIG. 1, into inlets 35 of fan 33, see FIGS. 2 and 3, out fan outlet 36, through heat exchanger 37 and out holes 138, 139 in the casing of conditioner 27. The water from turbine wheel 34 leaves turbine housing 32 by pipe 140, see FIG. 3, and after passing through heat exchanger 37 leaves air conditioner 27 by return water pipe 22a and returns to one of the water conditioners 15, 16 by return main 22.

It is well known that a heat conducting metal layer or barrier between water of one temperature and air of another temperature to be conditioned is more effective in exchanging heat from one fluid to the other if the fluids are made to scrub their respective sides of the barrier both to present fluid to the surface at a greater rate and to keep the surface scoured of a film of slow moving fluid. Thus to make the heat exchanger most effective and keep its required size to a minimum this invention provides novel means not only for causing the water to be supplied as the need is indicated by a thermostat sensing the need for conditioning of the air but the mechanical energy available in the water is used as supplied to vary the rate of presenting for conditioning the air to be conditioned. That is to say, both the air to be conditioned and the water to condition the air are intended to be put through the heat exchanger at properly proportioned rates and this could easily be done if there were a minimum of friction in the mechanical drive of the fan and if the minimum of friction requirement was not complicated by a requirement of substantially no noise. To eliminate both friction and nose from the turbine drive for the fan the novel and useful mechanism of FIG. 4 is provided.

Referring to FIG. 4, back plate 38 secured to turbine body 32 by screws 39 is secured to the frame 121 of conditioner 27 by screws, not shown. Stationary shaft 40 is threaded into back plate 38 and secured therein by lock nut 41. Shaft 40 is seen to be enlarged in diameter adjacent its free end. Clamped along the smaller diameter length of shaft 40 beginning at plate 38 are stationary parts; packed sealing washer 42, bearing journal sleeve 43; packed sealing washer 44; nonmagnetic gap sealing cap 45; packed sealing washer 46 and cup washer 47 pressed against the shoulder of shaft 40.

The open end of sealing cup 45 is secured into the large central opening in turbine body 32 as shown.

Pressed securely into turbine bearing support sleeve 51 are turbine bearings 49, 50 for which sealing washers 42, 44 act as end thrust abutments. Turbine wheel 34 and cylindrical driving magnet 52 are secured to bearing support sleeve 51. To prevent dirt from the turbine water being carried into the water filled gap between the perimeter of magnet 52 and sealing cup 45 a Teflon or other suitable flexible sheet seal 53 in annular form is positioned as shown between metal washers 54, 55 pressed into turbine housing 32.

When water from pipe 19a is admitted through valve body 28 and nozzle pipe 31 to impinge on turbine wheel 34 in housing 32, wheel 34 will revolve with bearings 49, 50, on journal sleeve 43 and take with it magnet 52 also mounted on bearing support sleeve 51.

The blade supporting plate 56 of double entrance space air circulating fan 33 is secured by rivets 57 to hub 58 secured to the exterior supporting sleeve 59 of fan bearings 60, 61, pressed therein between stationary thrust washers 62, 63, supported axially against cup washer 47, and cup washer 64, secured to the free end of shaft 40 by screw 65.

Secured at its small end to fan bearing support sleeve 59 to rotate therewith is funnel shaped support sleeve 66 for driven magnet 67 rotatably carried thereby in radially outwardly spaced relation with gap sealing cup 45.

It should be noted that concentric, radially spaced driving magnet 52 and driven magnet 67 are permanent magnets. Magnet 52 is charged with 8 alternate North and South poles circumferentially about its outer surface while magnet 67 is similarly charged about its inner surface. Thus when turbine wheel 34 rotates and takes magnet 52 with it, the magnetic coupling of magnets 52 and 67 across the magnetic gap, which includes sealing cup 45 with water inside and air outside, causes magnet 67 to hold step with magnet 52 and thus to cause fan 33 to rotate in synchronism with turbine wheel 34. There can be no possible leakage opening across the barrier between the air space in which fan 33 is located and the water spaces in which turbine wheel 34 is located because there is no mechanical connection between the turbine wheel and the fan wheel. Without such a mechanical connection there is no high friction seal to operate as a brake on the turbine shaft to prevent its operation until sufficient water is required to give the turbine sufficient driving torque to turn the shaft in the seal.

It is seen that with the unique arrangement of FIG. 4 a minimum of water impact on the turbine blades will start the turbine and cause the fan speed to follow the turbine speed continuously to coordinate the air flow with the water flow through the heat exchanger.

It is understood that when the space air would normally be too cold, water valves 20, 21 of FIG. 1 would be turned by link 25 to feed heated water from heater 15 to conditioner 27 and conversely when the space air would normally be too hot, valves 20, 21 would be turned to feed chilled water from chiller 16 to conditioner 27. In either case at each conditioner a valve is required within the valve body 28, see FIGS. 2 and 3, and a thermostat 29 sensitive to the space air temperature is required to control the valve. This conception of the need for a thermostat and valve combination which the user can set to a desired scale at the conditioner 27 in the space to be conditioned whether the space requires heating or cooling has led to the present conception of the way to provide the thermostat and valve combination of this invention as shown in FIGS. 5 to 11.

Referring now to FIGS. 5, 7, 8, and 9, the conditioning water control valve body 28 is hollow and is split in a plane with the two parts 28a and 28b of body 28 separated by a flexible diaphragm 70 and held together by screws not shown. The hollow interior of body part 28a includes: an inlet water space 71 connected with water inlet pipe 19a; a main valve space 71a separated by water screen 72 from space 71; a water outlet space 31a connected with space 71a by main valve port 73 and open to nozzle pipe 31; pilot valve space 74 connected with inlet water space 71 by drilled holes 75, 76, 77, and connected with outlet space 31a by drilled holes 78, 79. The hollow interior of body part 28b includes: main valve control space 71b separated from space 71a by diaphragm 70 and connected with pilot valve space 74 by restricted orifice 80 formed through diaphragm 70 and partitions 81, 82 of body parts 28a, 28b, respectively; and pilot valve pivot space 83 separated from space 74 by diaphragm 70.

Cylindrical hole part, 71b of space 71, opens to the outside of body part 28a to permit the assembly of main water screen 72 along the wall thereof and the threaded assembly of pilot water screen plug 77a in hole 77. Screen plug 77a supports on its surface pilot water screen 84 and is reduced in outside diameter under screen 84 to conduct pilot water from screen 84 through radial holes 85 and bore 86 to hole 77.

Water conduit holes 71, 76, 75, 78, 79, and inspection hole 87 have their open ends closed respectively by sealing screws 88, 89, 90, 91, 92 and 93.

Conically pointed restricted orifice pilot water inlet plug 94 and outlet plug 95 are formed at their outer ends with screw driven slots for longitudinal adjustment in respective conduit holes 75, 79 for relative spacing of their conical points in pilot valve space 74. See FIG. 8.

Pivot screw 96 is threaded into body part 28b to extend into pivot space 83 opening into space 97 into which supporting pipe 98 for thermostat 29 is secured as shown in FIG. 8. The conical pivot end of screw 96 is pivotally received in the conically bottomed hollow end of pilot valve blade 99 formed at its other end with a parallel sided flat blade section and with a threaded intermediate section which penetrates diaphragm 70. Pilot valve blade 99 is rockably secured on pivot screw 96 by diaphragm 70 held by nuts 100, 101, to blade 99 at a shoulder formed on blade 99 normal to the axis of blade 99 at the apex of the conical bottom in the hollow end thereof. With blade 99 rockably supported by diaphragm 70 and pivot screw 96 and centered by conical compression spring 102 as shown inlet and outlet orifice screws 94 and 95 are axially positioned to clear the flat blade end of pivot blade 99 on their respective sides. Pilot valve actuator wire 103 from thermostat 29 is linked at 104, FIG. 8, to pilot valve operating lever 105 riveted to pilot valve blade 99 as shown.

Figure 9:
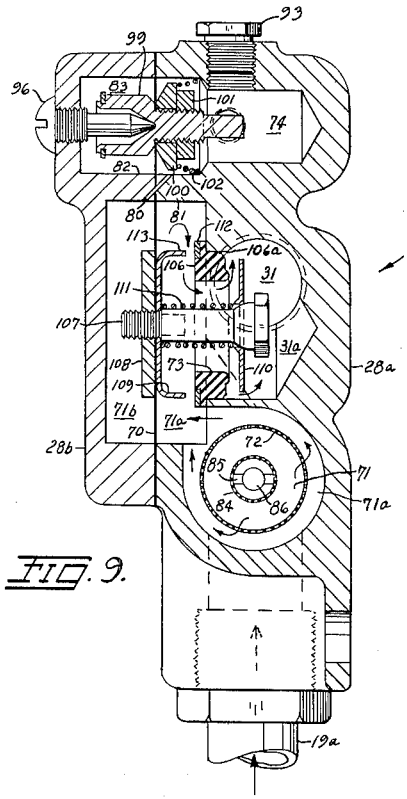
FIG. 9 is a sectional elevation along the line 9—9 of FIG. 7.
Figure 7:
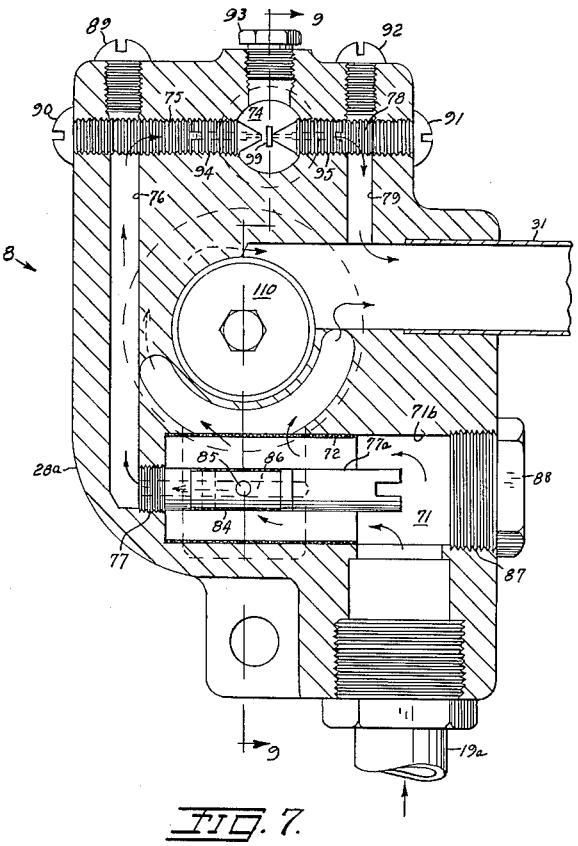
FIG. 7 is a fragmental vertical sectional elevation along the line 7—7 of FIG. 5.

Main valve port 73, FIG. 9 is seen to be formed through Teflon main valve seat bushing 106 pressed into a main valve port hole 106a between spaces 71a and 31a in the interior of body part 28a. Valve stem 107 penetrates diaphragm 70 to which it is secured by internally threaded washer 108 in space 71b and four legged spacing washer 109 in space 71a. Stem 107 is formed with a hex head for assembly use and a part spherical underhead section against which main valve 110 is rockably positioned by spring 111 backed by spacing washer 109 which limits the opening of valve 110 away from valve seat 106 by abutting retaining washer 112 of seat bushing 106 with its four legs 113.

The operation of the mechanism of valve body 28 is as follows. With air conditioning water under pressure from supply pump 26, see FIG. 1, reaching valve body 28 through pipes 19 and 19a and entering inlet space 71, see FIGS. 7, 8, and 9, the main conditioning water stream is filtered by screen 72 as it passes to space 71a, between washers 109, 112, through valve port 73, between valve seat 106 and valve 110, to pipe 31 and turbine housing 32, see FIGS. 2 and 3. At the same time the control water stream under pressure from space 71 is filtered through pilot water screen 84 through holes 85, 86, in plug 77a in hole 77 to hole 76 and on through hole 75 and the restricted axial pilot valve port in plug 94 to pilot valve space 74 from where the control water is bled through the restricted axial pilot valve port in plug 95 and on through holes 78, 79, to pipe 31.

It is understood that in response to the temperature of the space air to be conditioned, thermostat 29 moves pilot valve actuator wire 103 longitudinally, see FIG. 8, to rock lever 105 to rock pilot valve blade 99 between the pilot valve seat conical ends of plugs 95, 94, respectively, to admit control water under pressure to space 74 or to bleed water from space 74 or to modulate the rate of control water flow through space 74.

The positioning of main valve 110 with respect to its seat 106 and therefore the control of the rate at which air conditioning water passes through valve housing 28 from pipe 19a to pipe 31 is seen to be determined by the relative water pressures in spaces 71a and 71b. The water pressure in space 71a is substantially at all times the pressure of the main water stream from pipe 19a while the pressure in space 71b will be substantially the pressure in space 74 as felt through the restricted passageway 80 which is restricted for the purpose of preventing quick action of the main valve which otherwise would occur on quick action of pilot valve blade 99 and therefore cause water hammer in the main water system.

Should the thermostat sense a need for more air conditioning water, either hot or cold, actuator 103, see FIGS. 5 and 8, will be moved in the direction from the thermostat 29 to the valve 28 and lever 105 will rock the flat end of blade 99 away from pilot valve seat 94 and against seat 95 as shown. In this case the pressures in pilot valve space 74 and main valve control space 71b will be substantially equal and main valve 110 will be raised from its seat 106 as shown in FIG. 9. The movement of main claim 110 is, of course, responsive to the pressure in space 71b for the reason that the effective area of diaphragm 70 in space 71a is always less than its area in space 71b by whatever effective area valve 110 has exposed to the water pressure in space 71a. When pilot valve blade 99 is set to prevent the bleeding of water therefrom then the effective main valve opening pressure is the pressure in space 71a on the valve itself since the operating forces on the two sides of diaphragm 70 are substantially equal. When valve 110 is off its seat 106 and water is flowing therebetween there is still an opening pressure on valve 110 due to the directional changes of the flowing water and the slight pressure reduction in space 31. Therefore when pilot valve blade 99 is against pilot valve seat 95, main valve 110 will remain wide open but as blade 99 moves away from its seat 95 towards its seat 94 the pressure in space 74 and space 71b will reduce gradually to cause the pressure in space 71a to cause diaphragm 70 to close main valve 110 on its seat 106 so that when blade 99 in space 74 is against its seat 94 main valve 110 will be closed on its seat 106.

Remembering that the present air conditioning system must be operable wherever either air heating or cooling is required and that when heating is required valve operator 25, FIG. 1, is moved to utilize heated water from source 15, while when cooling is required operator 25 is moved to utilize chilled water from source 16, it is plain that thermostat 29 must be easily set to control the system when its duty is either heating or cooling the space air. The novel and useful thermostat 29, invented to complete this system, is here disclosed in FIGS. 2, 3, 5, 6, 10, 11, 12 and 13. The outer cover of the thermostat 29 is not shown in any of the figures but should be understood to be perforated for complete ventilation by the space air to be conditioned.

The two legged angle plate frame of thermostat 29 as seen in FIGS. 2, 3, 5, 6, 12 and 13 is seen to have a supporting leg 114 secured to supporting tube 98 by which thermostat 29 is rigidly held to valve body part 28b and an adjustment leg 115 having a vertical slot 116 formed therethrough to receive vertically slidably therein adjustment stud 117, the inner end of which is reduced in diameter and threadedly secured tightly to thermostat setting cam 132. The outer end of adjustment stud 117 is twice reduced in diameter and threaded over each step, first, to receive nut 133 resiliently to clamp frame leg 115 between setting cam 132 and spring friction clip 125 and, second, to receive nut 134 to secure the lower end of link 118 to stud 117, see FIG. 3.

The other end of link 118 is hinged to the free end of leg 119 of bell crank 120 pivot-hinged at 121 on air baffle 122, see FIG. 2. The free end of the other leg 123 of bell crank 120 acts both as an indicator for condition setting dial 124 and a setting lever for adjustment stud 117 with setting cam 132.

Stiff strap blade lever 130 is seen in FIGS. 5, 6, 12 and 13 to be welded at one end to resilient hinge strap 131 which is secured at its other end to frame leg 114 by screw 126 and nut 128.

Z-shaped resilient hinge strap 127, as indicated in FIG. 12, has one end screwed to frame leg 114 by screw 126 and nut 128 and its other end secured, as by brazing, to a space air temperature sensing bimetal strap or blade 129.

Thermostat-setting edge-cam 132, see FIGS. 5, 6, 12 and 13, is formed with two spaced parallel flat sides slidably confined between frame leg 115 of thermostat 29 and the adjacent edge of blade lever 130. The straight under edge of cam 132 is slidably supported on the inside face of frame leg 114 so that cam 132b is longitudinally positionable with respect to dial 124, FIG. 10, and the short end 135, see FIGS. 5 and 12, of bimetal strap 129 by movement of bell crank arm and indicator 123 over dial 124, see FIGS. 2, 5 and 12.

The upper working face of cam 132 is numbered 136 in FIGS. 5, 6, 12 and 13.

Figure 6:
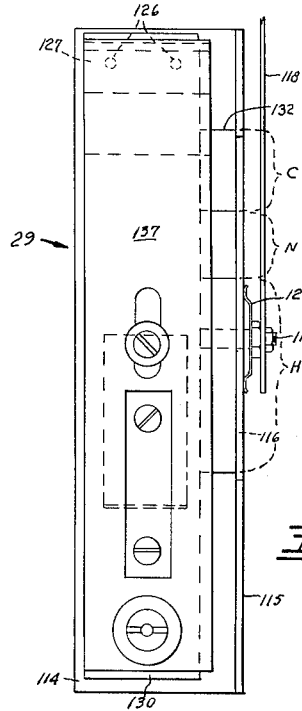
FIG. 6 is a fragmental front elevation along the line 6—6 of FIG. 5.
Figures 10, 11:
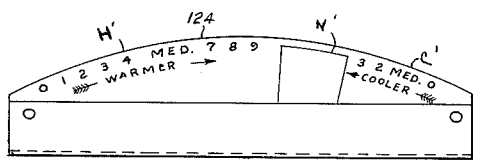
FIG. 10 is a front view of the thermostat dial only along the line 10—10 of FIG. 3.
FIG. 11 is an end view of the thermostat dial only along the line 11—11 of FIG. 2.

The free end of underneath or short leg 135 of bimetal blade 129 is seen in FIGS. 5 and 12 to be the cam follower for cam 132 whose cam edge 136 is seen to have three consecutive slopes therealong, i.e.: a cooling control slope C, a neutral or changeover slope, N; and a heating control slope H. These slopes correspond, respectively, with sections C and H of dial 124 in FIG. 2, for as pointer 123 of bell crank 120, see FIG. 2, is moved from left to right from dial section H to section N and then to section C bell crank 120 will be rotated clockwise and link 118 will move downwardly taking with it stud 117 and cam 132, the cam edge 136 of which will move its sections H, N, and C consecutively under the free end of the short or cam follower end 135 of bimetal blade 129. FIGS. 5 and 6 show cam 132 positioned with cam follower 135 on its heating control slope H, while FIGS. 12 and 13 show cam follower 135 on the cooling control slope C, of cam face 136 of cam 132.

Space air temperature sensing U-shaped bimetal strap 129 has its outside layer with the lesser temperature coefficient of expansion so that as the the air temperature decreases legs 135, 137 move closer together and as the air temperature increases legs 135, 137 of bimetal strap 129 move farther apart. As previously seen, whether the space air is consistently cold and heated water is required for conditioning it or whether the space air is consistently hot and chilled water is required for conditioning it, the appropriate setting of valves 20, 21 is made and the required water is supplied to the air circulating turbine and the heat exchanger in response to the same movement of valve actuator 103 which has previously been shown to be in the direction from thermostat 29 to valve 28 when valve diaphragm 70 is to lift valve 110 from its seat 106. As seen in FIG. 8, actuator 103 is biased toward valve 28 by spring 138, strained between pilot valve lever 105 and spring plate 139 through hole 140 in which actuator 103 extends.

At its thermostat end it is seen in FIG. 5 that actuator 103 is secured, as by welding, to end clip 141 fastened to the free end of spring strip loop 142, the other end of which is welded to blade lever 130. The position of pilot valve blade 99 between pilot valve seats 94, 95, is adjusted by screw 143 freely inserted through clip 141 and loop 142 and threaded into nut 144 secured to lever blade 130. Blade lever 130 hinged by spring 131 to frame leg 114 is limited in movement away from frame leg 114 by adjusting screw 145 threaded into nut 146 secured to leg 114. Thus with blade lever 130 against frame leg 114, screw 143 is adjusted to allow spring 138 to move actuator 103, lever 105 and pilot valve blade 99 to cover the restricted outlet from space 74 through plug 95 to put full water pressure on space 71b through orifice 80 to lift main valve 110 from its seat 106.

In like manner with blade lever 130 moved away from frame leg 114, actuator 103 will move therewith against the bias of spring 138 to move lever 105 and therewith pilot blade 99 away from restricted orifice plug 95 and against restricted orifice plug 94 to close main valve 110 on its seat 106. The adjustable stop screw 145 is to limit the movement of lever 130 away from frame leg 114 more than the necessary amount to close the main valve.

Having shown that when blade lever 130 is positioned to contact frame 114 main valve 110 is moved to open position and when blade lever 130 is positioned to contact adjustable screw 145 main valve 110 is moved to its closed position, it is noted that the blade lever 130 is normally biased by spring 138 towards its open position of main valve 110.

It is next noted that spring hinge 127 biases bimetal blade 129 toward rotation in the clockwise direction to maintain the short end 135 of bimetal blade 129 in contact with edge cam 132. Then to set the thermostat for heating cycle operation in accordance with the dial 124, see FIG. 5, it is only necessary to set dial pointer 123 of FIG. 2 to the particular dial making on the H end of dial 124 which is known to be the temperature of the space air at the time and then to turn screw 147 which extends freely through a clearance slot in bimetal leg 137, into threaded nut 149, welded to blade lever 130, until nut 148 threaded tightly onto screw 147, contacts the bimetal leg 137. The adjustment of screw 147 having been made when blade lever 130 was not controlled by thermostat 29, the main valve will be open and after the adjustment is made the main valve will stay open until the space air temperature is increased sufficiently for bimetal blade 137 to move away from bimetal blade 135 and take with it blade lever 130 to close the main valve 110.

Again assuming that the space air temperature is too warm for comfort and it is desired to set the thermostat to supply chilled air rather than heated air as required and assuming that the conditioning water available has been shifted to chilled water, dial pointer 123 of FIG. 2 will now be moved from the heating end H of dial 124 across the neutral section N to the cooling end C to the setting known to correspond to the space air temperature at the time. Moving the sliding cam 132 to contact the end of bimetal leg 135 on the cooling or C end of cam face 136 allows bimetal blade 129 to rotate clockwise with bimetal leg 137 sliding down screw 147 from the underside of nut 148, see FIG. 12. But now that the space air conditions are generally too warm and we want chilling water to flow until the space air has cooled off to our set point we note that at the proper position of bimetal blade 137 in its clockwise movement it must cause blade lever 130 to move counterclockwise to close the main valve.

As set forth in our copending application, Serial No. 305,580, filed August 28, 1963, and as illustrated in FIG. 12 thereof, threaded through nut 148a, which is secured to the end of bimetal blade 137, is a headless brass screw 149a internally and externally threaded and counterbored at one end to receive the head of steel screw 150 to the extending end of which doughnut shaped magnet 152 is tightly screwed to be held securely against brass screw 149a. A hole 151 in blade lever 130 will allow the extending end of magnetic screw 150 to blade lever 130 and allow magnet 152 on approaching blade 130 to magnetize the blade lever to lift it and pull actuator 103 to close the main valve 110. Thus using a screw driver with the screw driver slot in the outer end of brass screw 149, the magnet 152 is moved closer and closer to snap blade 130 until blade lever 130 is picked up by the magnet and the cooling adjustment of the thermostat is made.

Our unique valve and thermostat combination is seen to be such that normally the main valve will be open at all times but the thermostat is provided with a manual setting means to set the thermostat dial when the valve is supplying chilled water to the system to shut the valve when the space air temperature has dropped to a preset temperature and to set the thermostat dial when the valve is supplying heated water to the system to shut the valve when the space air temperature has risen to a preset temperature.

An important feature of thermostatically controlled valve 28 is that one or more of them can be controlled by a single thermostat 29. To accomplish this one of the valves 28 will be the master and will be controlled by a thermostat 29 as previously shown. The other valves used will be without their individual thermostats 29 but will be slaved to the master valve by connecting each of the pilot valve chambers of the slaved valves together by small tubing thus forcing all of the valves to respond to the pilot valve chamber pressure of the master as controlled by the master thermostat.

Having recited some of the objects of our invention illustrated and described some of the forms in which the inventions may be practiced and described their operation, we claim:

1. A space air conditioning apparatus comprising a plurality of hollow heat exchangers arranged in spaces to be heated, respectively, a central water temperature conditioner and a power driven water circulating pump connected together in series in a recirculating hydraulic circuit, said circuit having a pressure side and a return side, said exchangers being connected in parallel across said circuit, fans for the heat exchangers, respectively, each fan being arranged for circulating air from a preselected space into heat exchange relation to its associated exchanger and back to said space, water turbines for the fans, respectively, each turbine including a wheel driven only by the water being recirculated by the pump to the exchanger with which the turbine is associated, first permanent magnet means driven by said wheel, all moving parts of the turbine terminating interiorly of, and being sealed within, the circuit by a stationary enclosing wall, a portion of which is nonmagnetic, and complementary permanent magnet means exteriorly of the circuit and connected to the fan and magnetically connected to the first permanent magnet means through said portion of the enclosing wall, for driving the fan by the turbine wheel.

2. A space air conditioning apparatus according to claim 1 wherein water valve means are provided for the exchangers, respectively, and each water valve means is responsive to the temperature of the air in said space which is conditioned by its associated exchanger for controlling the flow rate of water to its associated exchanger as a function of said temperature.

References Cited by the Examiner

UNITED STATES PATENTS

| | | | |
|---|---|---|---|
| 946,889 | 1/1910 | Veil | 165—85 |
| 2,144,030 | 1/1939 | Potter | 165—85 X |
| 2,255,292 | 9/1941 | Lincoln | 165—85 X |
| 2,394,109 | 2/1946 | Sanchez | 165—85 X |
| 2,460,015 | 1/1949 | Jones | 310—103 |
| 2,692,759 | 10/1954 | Swenson et al. | 165—85 X |
| 2,705,762 | 4/1955 | Pile | 310—104 |

FOREIGN PATENTS

| | | |
|---|---|---|
| 922,536 | 2/1955 | Germany. |

ROBERT A. O'LEARY, *Primary Examiner.*

ALDEN D. STEWART, CHARLES SUKALO,
*Examiners.*